(12) United States Patent
Haley et al.

(10) Patent No.: US 8,126,126 B2
(45) Date of Patent: Feb. 28, 2012

(54) METHOD FOR PROVIDING CUSTOM RING-BACK TONES

(75) Inventors: James E. Haley, Aston, PA (US); Douglas R. Jones, Medford, NJ (US); John H. Wurster, Basking Ridge, NJ (US); Susan M. Middleswarth, Silver Springs, MD (US)

(73) Assignee: Verizon Services Corp., Ashburn, VA (US)

( * ) Notice: Subject to any disclaimer, the term of this patent is extended or adjusted under 35 U.S.C. 154(b) by 1577 days.

(21) Appl. No.: 11/504,492

(22) Filed: Aug. 15, 2006

(65) Prior Publication Data
US 2008/0063168 A1    Mar. 13, 2008

(51) Int. Cl.
*H04M 3/42* (2006.01)
(52) U.S. Cl. ................ 379/201.01; 379/88.19
(58) Field of Classification Search ........... 379/142.03–142.18, 201.01
See application file for complete search history.

(56) References Cited

U.S. PATENT DOCUMENTS

| | | | |
|---|---|---|---|
| 6,496,578 B1 * | 12/2002 | Chen et al. | 379/211.02 |
| 6,714,637 B1 * | 3/2004 | Kredo | 379/215.01 |
| 7,016,348 B2 * | 3/2006 | Laursen et al. | 370/389 |
| 7,027,569 B2 * | 4/2006 | Price | 379/88.16 |
| 7,200,139 B1 * | 4/2007 | Chu et al. | 370/352 |
| 7,340,043 B2 * | 3/2008 | Crockett et al. | 379/88.17 |
| 7,613,287 B1 * | 11/2009 | Stifelman et al. | 379/215.01 |
| 7,664,236 B2 * | 2/2010 | Radziewicz et al. | 379/88.25 |
| 2004/0120494 A1 * | 6/2004 | Jiang et al. | 379/210.01 |
| 2004/0174983 A1 * | 9/2004 | Olschwang et al. | 379/377 |
| 2004/0218734 A1 * | 11/2004 | Gilbert et al. | 379/76 |
| 2005/0105706 A1 * | 5/2005 | Kokkinen | 379/201.01 |
| 2005/0117726 A1 * | 6/2005 | DeMent et al. | 379/142.01 |
| 2005/0249344 A1 * | 11/2005 | Mueller et al. | 379/207.15 |
| 2006/0154658 A1 * | 7/2006 | Holder et al. | 455/418 |
| 2006/0210033 A1 * | 9/2006 | Grech et al. | 379/88.19 |
| 2006/0215830 A1 * | 9/2006 | Simpson | 379/211.02 |
| 2007/0010195 A1 * | 1/2007 | Brown et al. | 455/3.06 |
| 2007/0116253 A1 * | 5/2007 | Batni et al. | 379/399.01 |
| 2007/0211872 A1 * | 9/2007 | Cai et al. | 379/142.01 |
| 2007/0223663 A1 * | 9/2007 | Benco et al. | 379/142.01 |

FOREIGN PATENT DOCUMENTS

WO    WO 2004023833 A1  *  3/2004

* cited by examiner

*Primary Examiner* — Fan Tsang
*Assistant Examiner* — Assad Mohammed

(57) ABSTRACT

A method is provided for providing customized ring-back tones to callers on a wireline network such as a public switched telephone network having an advanced intelligent network or a VoIP network. When a call request is received from a calling party to connect to a called party through a wireline telephone network it is determined if the calling party is identified in a screening list for the called party. If so, then a customized audible ring-back tone is played to the calling party until the called party is connected to the calling party or until the call request is terminated.

18 Claims, 8 Drawing Sheets

METHOD FOR PROVIDING CUSTOM RING-BACK TONES

BACKGROUND INFORMATION

The public switched telephone network's (PSTN) primary service has been to provide Plain Old Telephone Service (POTS), which has been accomplished using circuit switching technology and techniques. Traditionally, calls were established using circuits having defined bandwidth and characteristics suitable for voice transfer. In contrast, the Internet is a packet switched network designed for data transfer in which bandwidth can be allocated as needed. The PSTN and the Internet are evolving, to an extent, so as to adopt certain aspects and capabilities of the other.

One service that is involved in the evolution of both networks is voice traffic. At a high level, the traditional circuit switch telephone network is migrating towards transporting voice using packet switching technology. This offers the prospect of increased efficiencies and utilization of common equipment for voice, data, and video traffic. Similarly, the Internet that was initially developed to handle data transfer between computers has been adapted to carry voice calls. Various approaches have been created to convey voice over the Internet ("VoIP"), and many of the capabilities present in the PSTN are being adapted to VoIP environments The proliferation of wireless telephones on relatively new networks that are entirely or at least in part digital-based has led to the advent of numerous features on wireless systems that are not available on traditional wireline systems. However, with the advent of advanced intelligent network (AIN) and computer switching on wireline systems and the use of VoIP in packet-switched networks such as the Internet, these wireless features are becoming possible and are being requested or demanded by the consuming public. Currently, for instance, when a telephone subscriber on a wireline or wireless phone calls another telephone subscriber, the caller hears audible ringing (a ring-back tone) until the called party answers the phone. Generally, the ring-back tone is a standard signal and sounds much like a telephone ringing. However, wireless subscribers are able in some instances to designate a certain tone, song clip or voice message to be played as a ring-back tone to all callers, designated groups of callers or individual callers. For example, Verizon Wireless of Bedminster, N.J. offers ring-back tones that may be purchased and downloaded through their website at http://ringbacktones-.vzw.com/browse_2.jsp. This allows a subscriber to personalize their telecommunications service and such personalization is desirable to implement in wireline and VoIP telephone systems.

BRIEF DESCRIPTION OF THE SEVERAL VIEWS OF THE DRAWING(S)

Reference will be made to the accompanying drawings, which are not necessarily drawn to scale, and wherein.

DETAILED DESCRIPTION OF THE PREFERRED EMBODIMENTS

Figure 1A:
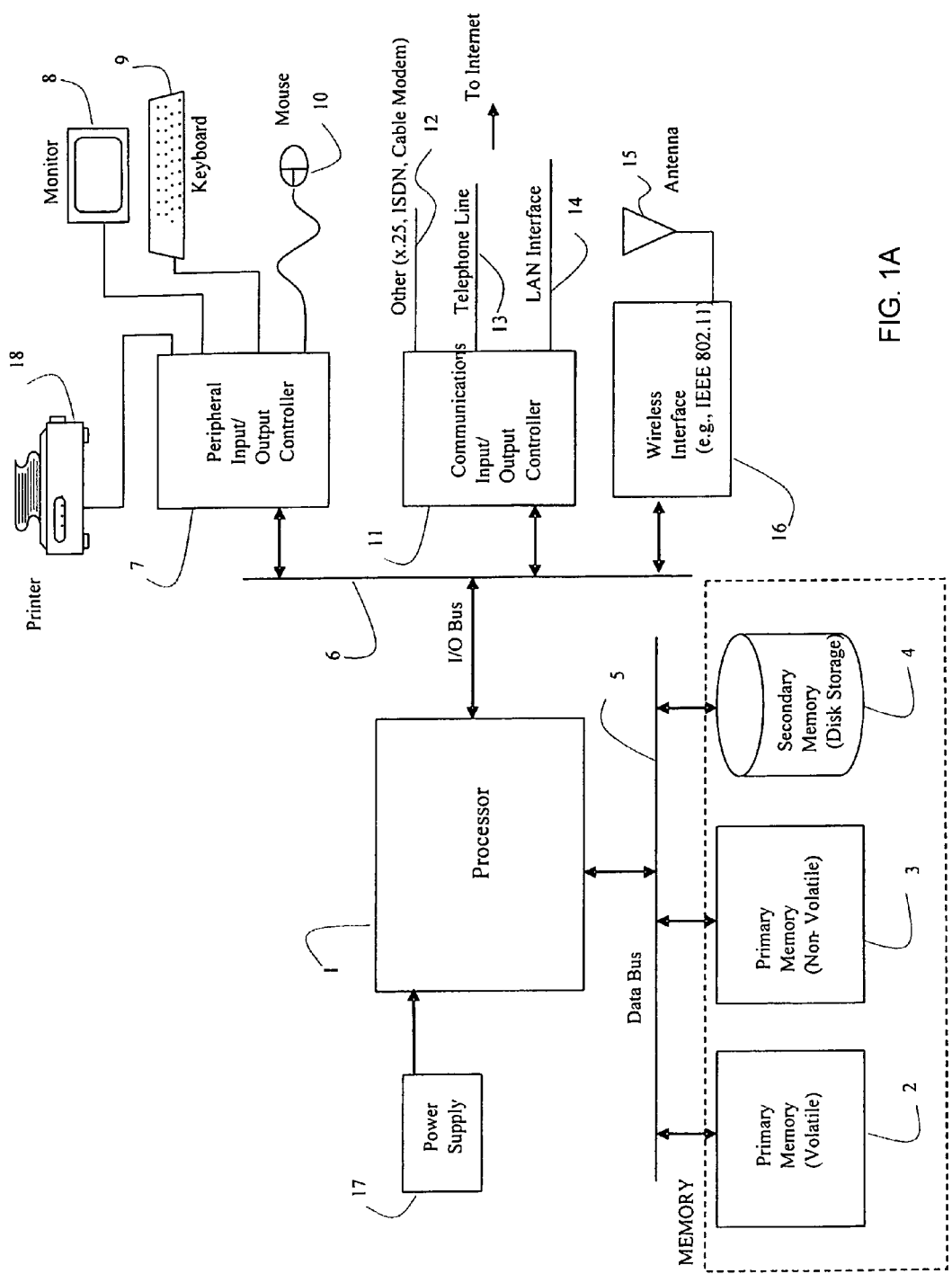
FIG. 1A is an illustration of one embodiment of a computing device that can be used to practice aspects of the present invention.

Preferred embodiments that may be implemented according to the present invention now will be described more fully with reference to the accompanying drawings, in which some, but not all embodiments of the invention are shown. Indeed, this invention may be embodied in many different forms and should not be construed as limited to the embodiments set forth herein. Rather, these embodiments are provided so that this disclosure will satisfy applicable legal requirements. Like numbers refer to like elements throughout.

The preferred embodiment may be implemented as a method, a data processing system, or a computer program product. Accordingly, the preferred embodiment may take the form of an entirely hardware embodiment, an entirely software embodiment, or an embodiment combining software and hardware aspects. Furthermore, implementations of the preferred embodiment may take the form of a computer program product on a computer-readable storage medium having computer-readable program instructions (e.g., computer software) embodied in the storage medium. More particularly, implementations of the preferred embodiments may take the form of web-implemented computer software. Any suitable computer-readable storage medium may be utilized including hard disks, CD-ROMs, optical storage devices, or magnetic storage devices.

The preferred embodiments according to the present invention are described below with reference to block diagrams and flowchart illustrations of methods, apparatuses (i.e., systems) and computer program products according to an embodiment of the invention. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

In the preferred embodiments referenced herein, a "computer" or "computing device" may be referenced. Such computer may be, for example, a mainframe, desktop, notebook or laptop, a hand held device such as a data acquisition and storage device, or it may be a processing device embodied within another apparatus such as, for example, a set top box for a television system or a wireless telephone. In some instances the computer may be a "dumb" terminal used to access data or processors over a network. Turning to FIG. 1A, one embodiment of a computing device is illustrated that can be used to practice aspects of the preferred embodiment. In FIG. 1A, a processor 1, such as a microprocessor, is used to execute software instructions for carrying out the defined steps. The processor receives power from a power supply 17 that also provides power to the other components as necessary. The processor 1 communicates using a data bus 5 that is typically 16 or 32 bits wide (e.g., in parallel). The data bus 5 is used to convey data and program instructions, typically, between the processor and memory. In the present embodiment, memory can be considered primary memory 2 that is RAM or other forms which retain the contents only during operation, or it may be non-volatile 3, such as ROM, EPROM, EEPROM, FLASH, or other types of memory that retain the memory contents at all times. The memory could also be secondary memory 4, such as disk storage, that stores large amount of data. In some embodiments, the disk storage may communicate with the processor using an I/O bus 6 instead or a dedicated bus (not shown). The secondary memory may be a floppy disk, hard disk, compact disk, DVD, or any other type of mass storage type known to those skilled in the computer arts.

The processor 1 also communicates with various peripherals or external devices using an I/O bus 6. In the present embodiment, a peripheral I/O controller 7 is used to provide standard interfaces, such as RS-232, RS422, DIN, USB, or other interfaces as appropriate to interface various input/output devices. Typical input/output devices include local printers 18, a monitor 8, a keyboard 9, and a mouse 10 or other typical pointing devices (e.g., rollerball, trackpad, joystick, etc.).

The processor 1 typically also communicates using a communications I/O controller 11 with external communication networks, and may use a variety of interfaces such as data communication oriented protocols 12 such as X.25, ISDN, DSL, cable modems, etc. The communications controller 11 may also incorporate a modem (not shown) for interfacing and communicating with a standard telephone line 13. Finally, the communications I/O controller may incorporate an Ethernet interface 14 for communicating over a LAN. Any of these interfaces may be used to access a wide area network such as the Internet, intranets, LANs, or other data communication facilities.

Finally, the processor 1 may communicate with a wireless interface 16 that is operatively connected to an antenna 15 for communicating wirelessly with another device, using for example, one of the IEEE 802.11 protocols, 802.15.4 protocol, or a standard 3G wireless telecommunications protocols, such as CDMA2000 1x EV-DO, GPRS, W-CDMA, or other protocol.

Figure 1B:
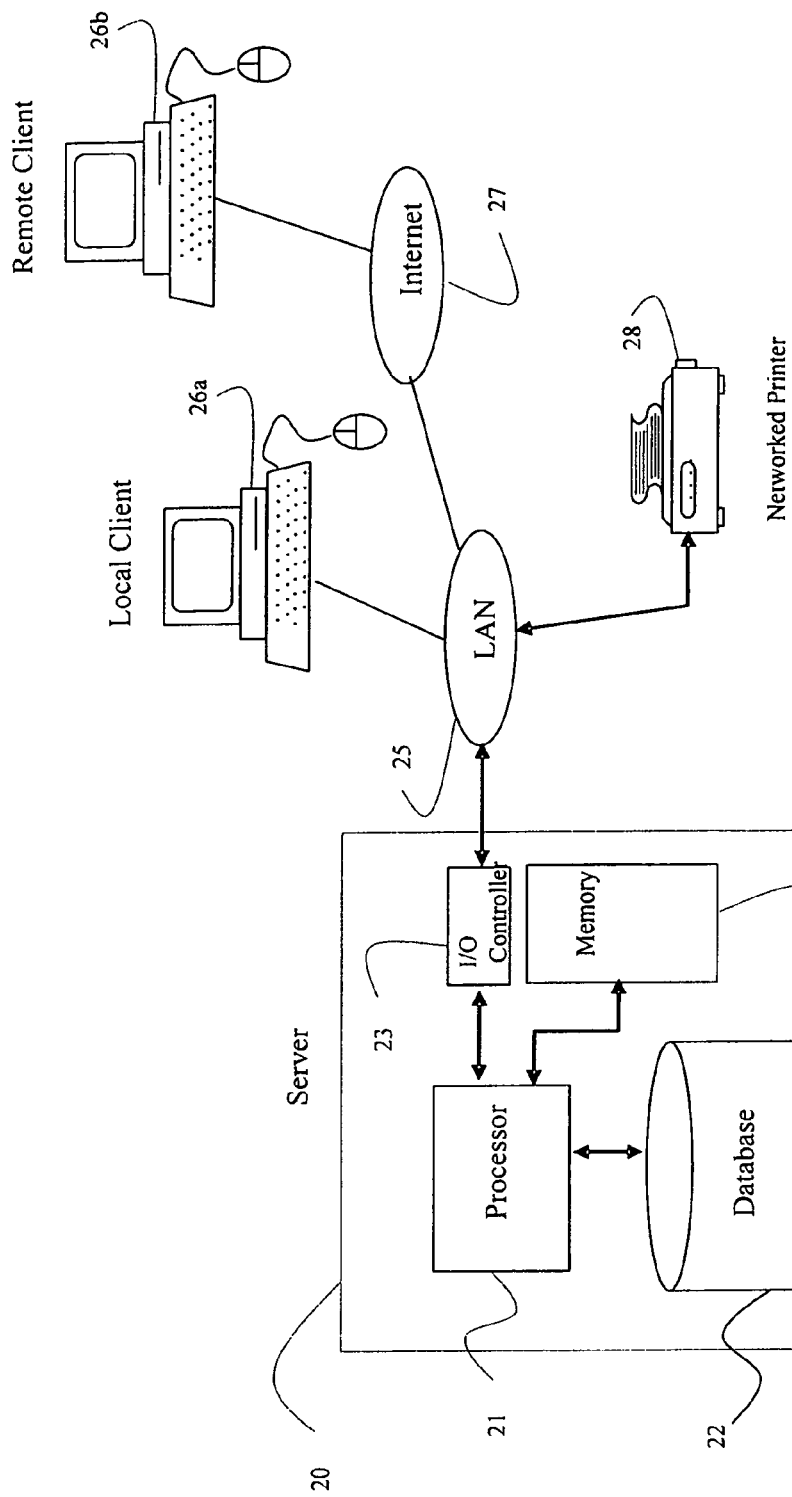
FIG. 1B is an embodiment of a processing system having a distributed communication and processing architecture that may be used to practice aspects of the present invention.

An alternative embodiment of a processing system that may be used is shown in FIG. 1B. In this embodiment, a distributed communication and processing architecture is shown involving a server 20 communicating with either a local client computer 26a or a remote client computer 26b. The server 20 typically comprises a processor 21 that communicates with a database 22, which can be viewed as a form of secondary memory, as well as primary memory 24. The processor also communicates with external devices using an I/O controller 23 that typically interfaces with a LAN 25. The LAN may provide local connectivity to a networked printer 28 and the local client computer 26a. These may be located in the same facility as the server, though not necessarily in the same room. Communication with remote devices typically is accomplished by routing data from the LAN 25 over a communications facility to a wide area network 27, such as the Internet. A remote client computer 26b may execute a web browser, so that the remote client 26b may interact with the server as required by transmitted data through the wide area network 27, over the LAN 25, and to the server 20.

Many other alternatives and architectures are possible and can be used to practice the preferred embodiments, as is well known. The embodiments illustrated in FIGS. 1A and 1B can be modified in different ways and be within the scope of the present invention as claimed.

The preferred embodiments according to the present invention allow both standard circuit-switched or packet-switched (e.g, VoIP) telephony subscribers to replace the traditional ring-back tone (the "ringing" tone heard by someone calling a subscriber's phone number) with a customized ring-back tone generated from a sound file. The custom ring-back tone may be a segment of a song, a personalized greeting, a recorded message or even a joke. Specific ring-back tones may be assigned based on the caller's telephone number, time of day and day of the week. Users may manage a ring-back tone service by using a web-based service management system. By using a web-page, a user may update screening lists and message playback options. A user may choose from a list of available ring-back tones, or record their own.

Generally, a first preferred embodiment according to the invention provides a system and method for providing a custom ring-back tone service to wireline users by utilizing the AIN network including service control points (SCP), service switching points (SSP), and intelligent peripherals (IPe). A second preferred embodiment according to the invention provides a system and method for providing a custom ring-back tone service to wireline users by utilizing a voice over Internet protocol (VoIP) network including a ring-back tone (RBT) application server, a media gateway controller (MGC), and a media server.

According to the first preferred embodiment, a user is provided with an AIN termination attempt trigger (TAT) or termination resource availability (TRA) trigger that causes the ring-back tone to be played to callers. The IPe is used to store the various tones and messages that are made available to users. The ring-back tone service may be made available as a service to users of a telephone system, and may require a paid subscription.

AIN is a telephone network architecture that provides a separation between service logic and switching equipment.

Intelligence is taken out of the switching equipment and placed in computer nodes that are distributed throughout the network. This allows a network operator to add new services without having to redesign switching equipment to support the new services. AIN was developed by Bell Communications Research and is now recognized as an industry standard in North America. AIN architecture network elements include: service switching points (SSPs), which are switches interconnected by switching system 7 (SS7) links that recognize AIN calls and generate SS7 messages to other SSPs or query a service control point (SCP) for routing instructions; SS7 is the current international signaling standard for all digital exchanges with integrated services, which allows call control and transaction messages from the integrated voice and data network to be transferred on communications paths that are separate from the voice and data connections. It delivers out-of-band signaling that provides fast call setup by means of high-speed, circuit-switched connections and transaction capabilities which deal with remote database interactions; SCPs are remote computer database within the SS7 network that receive queries from SSPs in order to process applications such as 800 and LNP number lookups and calling card verification; service transfer points (STPs) are packet switches within the SS7 network that route network call information among other circuit switches and between SSPs and SCPs; service management systems (SMSs), which serve as the operations system for the SCP by providing data management, service management and reporting capabilities; and, IPe's, which host special-purpose service circuits (e.g., fax, text-to-speech, voice recognition, announcements, etc.) for use under SCP control.

Figure 2:
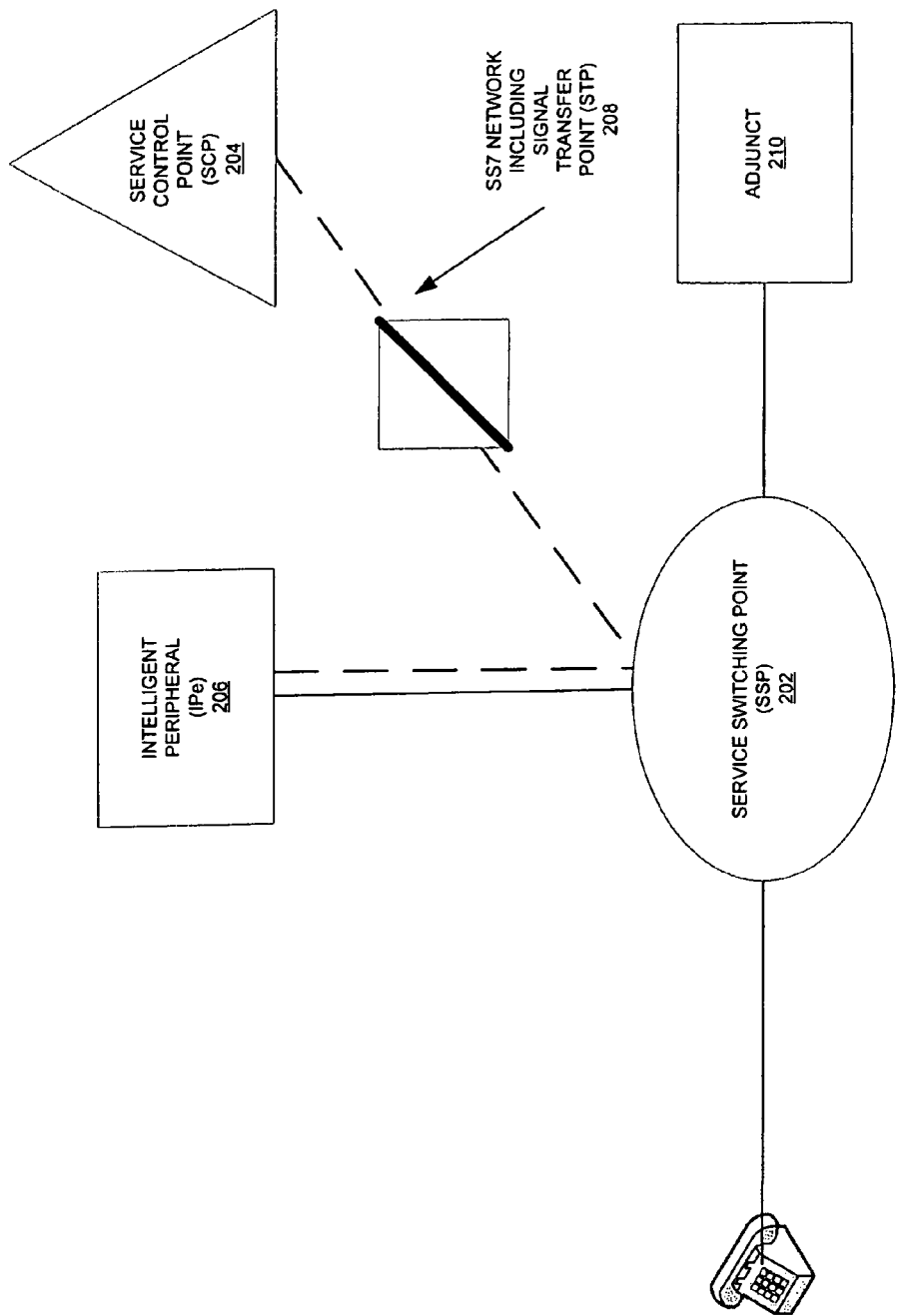
FIG. 2 is a prior art diagram of basic AIN architecture.

FIG. 2 is a prior art diagram of basic AIN architecture. In FIG. 2, the SSP 202 is an AIN-capable switching system. In addition to providing end users with access to the network and performing any necessary switching and functionality, the SSP 202 allows access to the set of AIN capabilities. The SSP 202 has the ability to detect requests for AIN-based services and establish communications with the AIN service logic located at the SCPs 204. The SSP 202 is able to communicate with other network systems (e.g., intelligent peripherals (IPe's) 206) as defined by the individual services.

The SCP 204 provides the service control. There are two basic parts to an SCP 204. One part is the application functionality in which the service logic is installed after the services have been created. This application functionality sits on top of the second basic SCP part, a set of generic platform functionalities that are developed by SCP vendors. This platform functionality is shared among the service logic application programs in the application functionality. The platform functionality also provides the SS7 interface to switching systems. As shown in FIG. 2, the SCP 204 is connected to the SSPs 202 by the SS7 network 208.

An SCP 204 interacts with "triggers" which are provisioned points in a call where processing may be interrupted for instructions. When a trigger is encountered, a query is sent to the SCP database; the subsequent return of instructions from the SCP 204 directs the next step in the call process. AIN release 0.1 separates the call model into an originating call model (originating half call), and the terminating call model (terminating half call) and provides additional triggers, including the termination attempt trigger (TAT). The TAT allows implementation of a single number reach and incoming call screening services as well as creation of calling name services using the AIN 0.1 protocol (and subsequent releases of AIN).

The IPe 206 provides resources such as customized and concatenated voice announcements, voice recognition, and dual-tone multifrequencies (DTMF) digit collection. The IPe 206 contains a switching matrix to connect users to these resources. In addition, the IP supports flexible information interactions between an end user and the network. It has the resource management capabilities to search for idle resources, initiate those resources, and then return them to their idle state.

The interface between the SSP 202 and the IPe 206 is an integrated services digital network (ISDN), primary rate interface (PRI), and/or basic rate interface (BRI). The IPe 206 has the switching functionality that provides the ISDN interface to the switching system.

The adjunct 210 shown in FIG. 2 is functionally equivalent to an SCP, but it is connected directly to an SSP. A high-speed interface supports the communications between an adjunct 210 and an SSP 202. The application-layer messages are identical in content to those carried by the SS7 network 208 between the SSP 202 and the SCP 204.

Figure 3:
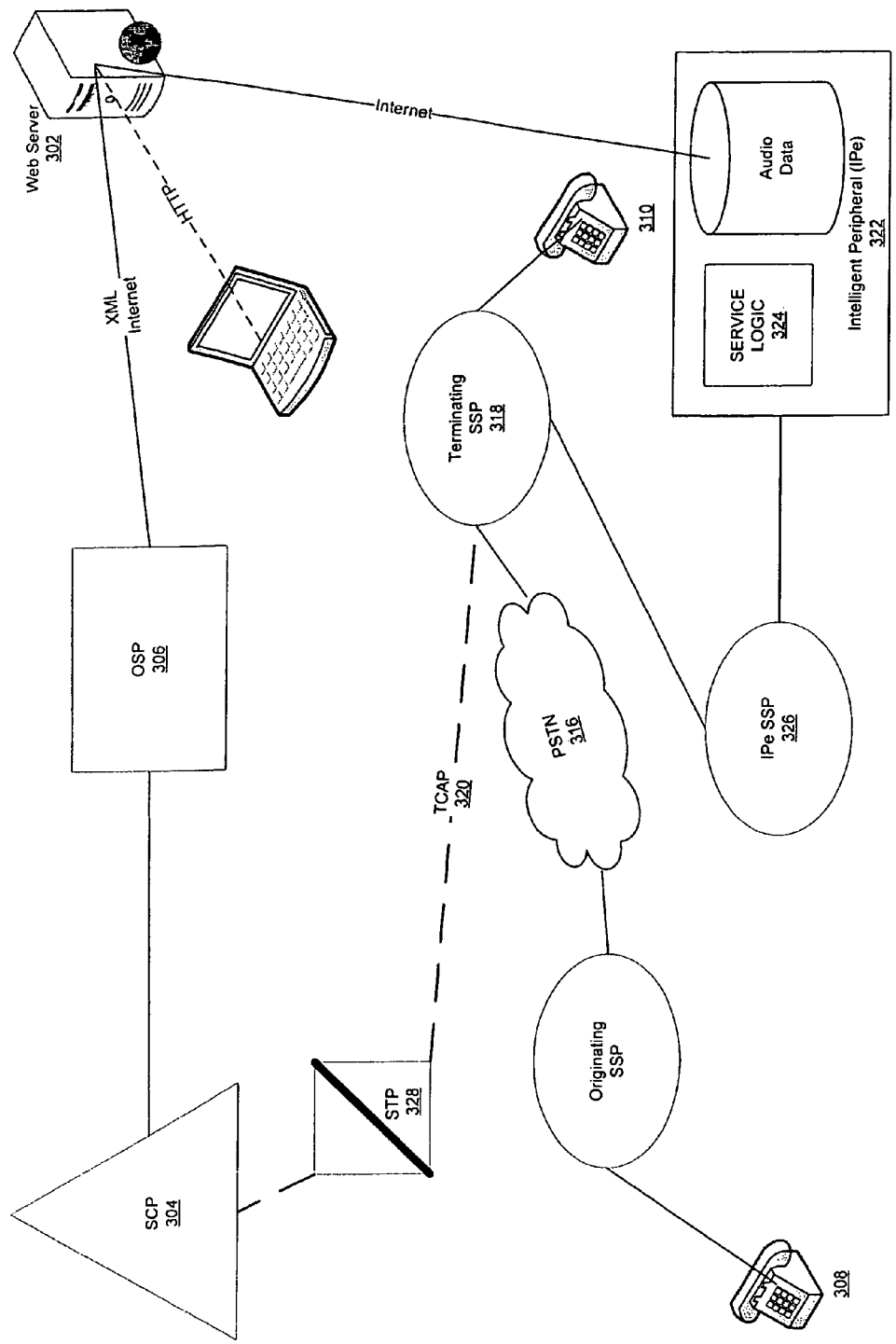
FIG. 3 is a preferred embodiment of an exemplary system for implementing a preferred embodiment according to the present invention for providing custom ring-back tones on an AIN wireline network.

FIG. 3 is an exemplary system 300 of an embodiment according to the present invention for providing custom ring-back tones on a wireline network. In FIG. 3 and from a provisioning standpoint, a web-based application server 302 is accessed by users to manage their customized ring-back tones service. The web server 302 interacts with and stores subscriber data in an SCP 304. A user updates or manages their ring-back tones service via a web page through the web-server 302. The web-server 302 sends data from the web-page to the SCP 304. In one instance, this data may be sent in the form of an XML document to the SCP 304 via an open service platform (OSP) 306 such as an XML-to-AIN gateway. In other instances the data may be sent in other formats such as, for example, HTML, and the OSP may be an Internet gateway or IP gateway where the gateway 306 converts the message in whatever format it is in to SCP protocol and send the data on to the SCP 304. Customer call processing records in a database associated with the SCP 304 are then updated or managed according to the data.

Referring to FIG. 3, an example call flow for a custom ring-back tone feature using an AIN termination attempt trigger may comprise a caller 308 calling a terminating line 310 that is provisioned with an AIN TAT. An originating SSP 312 sends the call to the terminating SSP 314 via the PSTN 316. The incoming call to the terminating line 310 encounters the TAT at the terminating SSP 318. The terminating SSP 318 launches an AIN transaction capabilities application part (TCAP) query via the SS7 network 320 to the SCP 304. TCAP is the portion of the SS7 protocol that is used to make database queries to SCPs. It is used to support services such as 800 and LNP number translation, as well as other functions such as embodiments of customized ring-back tones according to the present invention. Subsequent to the TCP query. AIN service logic in the SCP 304 is activated for the telephone number associated with the terminating line 310. The service logic determines if the customized ring-back tones service feature is active for the terminating line 310. If active, then the service logic uses the time of day, the day of the week, caller ID, or other information to process the call. For example, a custom ring-back tone subscriber may have a screening list that plays a special message to the caller if the caller's caller ID is in the screening list. In this example of the service, the calling party's ID is used to query the subscriber's screening list. If a match is found, the SCP 304 interacts with an IPe 322.

The SCP 304 returns a forward call message to the 10-digit number of the IPe 322. Included in the forward call message may be an announcement ID number to be played on the IPe 322. The IPe 322 answers the call from the SCP 304 and runs service logic 324 associated with the customized ring-back tones feature. The IPe 322 may also, in some instances, query back to the SCP 304 for an announcement ID to be played to the caller. The IPe 322 also generates a call to the called party 310. The terminating SSP 318 launches a second TAT to the SCP 304. At the SCP 304, the service logic is once again activated and identifies the calling party ID of the IPe 322. The SCP 304 then returns an authorized termination to the called number 310. The terminating SSP 318 then routes the call to the called party 310. The IPe 322 plays a customized audible tone to the calling party 308. As previously described, this time may be determined by the ID of the calling party, time of day, day of the week, etc.

When the called party 310 answers, an answer supervision message is sent to the IPe 322. The IPe 322 then stops playing the custom audible tone to the calling party 308. A 2-B channel transfer message is sent to the IPe SSP 326 The 2B channel transfer releases the 2 separate calls from the PRI that connects the IPe SSP 326 to the IPe 322. This allows the bridging of the calls to take place in the IPe SSP 326 and not in the IPe 322. This is a way to save resources on the PRI and the IPe 322. The calling party 308 and the called party 310 are then connected. However, if the IPe 322 dials the called party 310 and receives a busy condition, then the customized ring-back tone is not played to the calling party 308 and the caller 308 will hear a normal busy signal.

Figure 4:
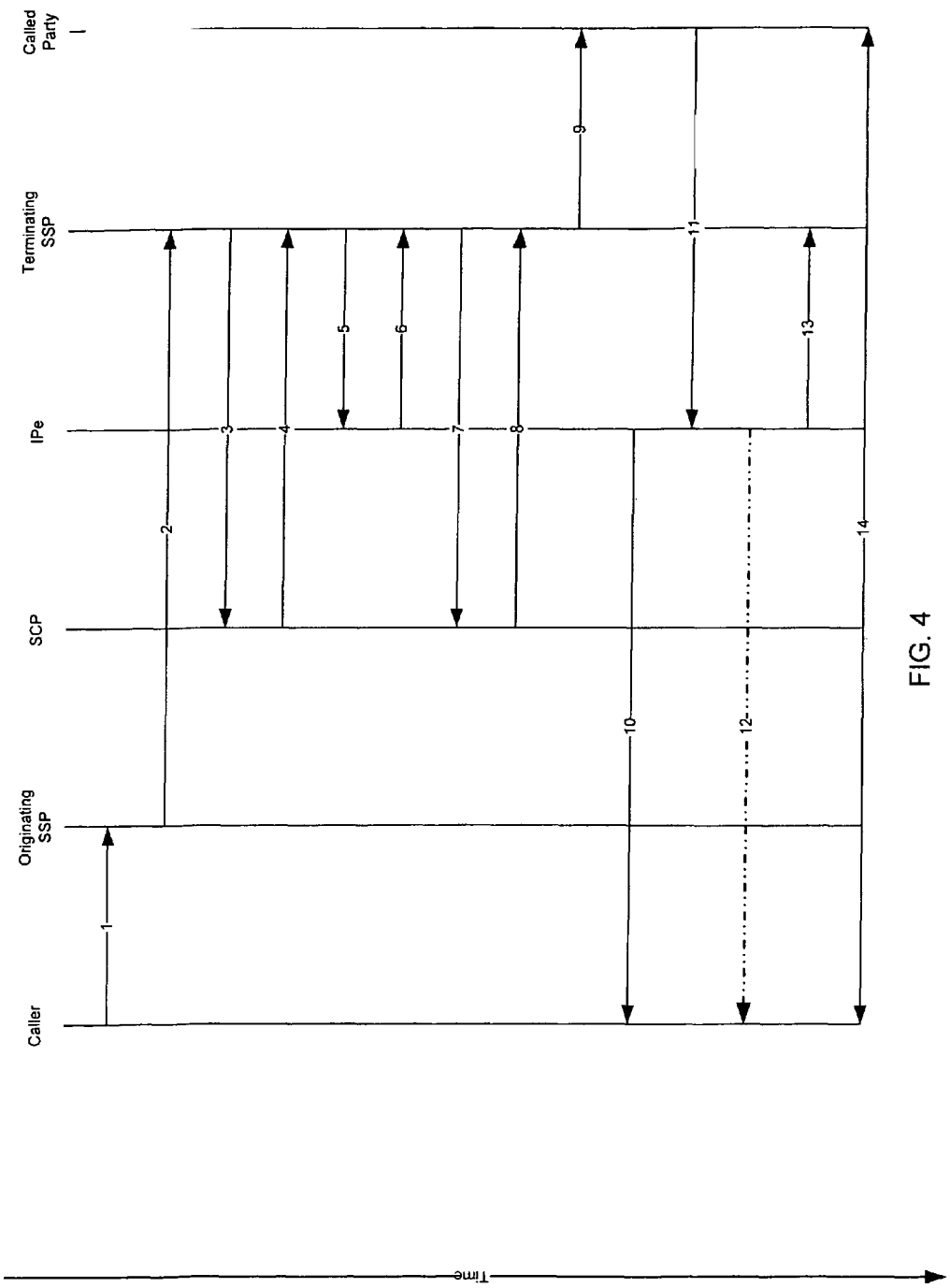
FIG. 4 is an exemplary call flow diagram that illustrates the steps of a method for playing ring-back tones over an AIN network, in accordance with a preferred embodiment.

The preferred embodiment thus takes advantage of the data retrieval capability of the AIN and an IPe to retrieve and play for a calling party, selected tones associated with a subject telephone number. FIG. 4 illustrates the steps of a method for playing ring-back tones, in accordance with a preferred embodiment.

In step 1, the Caller initiates a first communication by dialing a Called Party at a called number, for example 123-456-7890. The first communication, which includes the called number, is received by an originating SSP 312. At step 2, the originating SSP 312 sends the first communication to a terminating SSP 318 via the PSTN 316. The called number (123-456-7890) has a termination attempt trigger (TAT) assigned to it at the terminating SSP 318. At step 3, the TAT causes an AIN query message to be sent for all calls originating from any caller and dialed to 123-456-7890. Thus, in step 3, the terminating SSP 318 recognizes the 123-456-7890 number as having an AIN TAT assigned to it. In response to the trigger, the terminating SSP 318 launches a first query message to the AIN SCP 304 through the appropriate signal transfer point (STP) 328. In this step 3, the calling party ID is the telephone number of the Caller (e.g., 404-555-1234), which is used to query a screening list associated with the called party number (i.e., 123-4556-7890) to determine if the calling party is to receive a customized ring-back tone.

In response to the AIN SCP 304 receiving the first query message, the AIN SCP 304, which stores the call processing logic for the ring-back tones service, conducts step 4 which includes sending a first response message to the terminating SSP 318. This first response message includes a 10-digit number (i.e., telephone number) of an intelligent peripheral device (IPe) 322, which contains both ring-back tones service logic 324 and recorded announcement scripts 330. The first response message also includes a script identifier that identifies the script that is to be played to the Caller. Specifically, the AIN SCP 304 sends the first response message to the terminating SSP 318 and in step 5 the terminating SSP 318 forwards the first response message through an IPe SSP 326 to the IPe 322.

At step 6, the IPe 322 answers the call and executes the ring-back tones service logic where it generates a call to the Called Party that terminates at the terminating SSP 318. At step 7, the terminating SSP 318 launches a second TAT in response to the IPe identifier that causes a second query message to the SCP 304. In response to the second query message, at step 8 the SCP 304 activates the ring-back tones service logic and identifies the calling party ID of the IPe 322, which indicates that the IPe 322 is prepared to play the customized ring-back tone to the Calling Party. This lets the SCP 304 know that the IPe 322 has been "activated" by a previous AIN trigger to play a ring-back tone. The SCP 304 returns a second response message to the terminating SSP 318 that includes an authorized termination to the Called Party. In turn, at step 9, the terminating SSP 318 routes the first communication (the call) to the Called Party.

At step 10, the IPe 322 plays the customized audible tone of the ring-back tones service to the Calling Party. At step 11, the Called Party answers and an answer supervision message is sent to the IPe 322. At step 12, the IPe 322 stops playing the custom audible tone to the Calling Party (represented by a dashed line on FIG. 4). At step 13, the IPe 322 sends a 2B channel transfer (TBCT) message to the IPe SSP 326, which ends the two connections between (1), the IPe 322 and the Calling Party and (2), the IPe 322 and the Called Party. This releases the PRI connection from the IPe SSP 326 to the IPe 322 and allows the call between the calling and the called party to be bridged at the IPe SSP 326. At step 14, the Calling Party and the Called Party are connected.

A second preferred embodiment according to the present invention is a system and method to provide a customized audible ring-back tone over a voice over IP (VoIP) network, as such networks are well known. In this preferred embodiment, VoIP protocols and VoIP network elements provide the ring-back tone service in place of the previously described AIN system and method.

Figure 5:
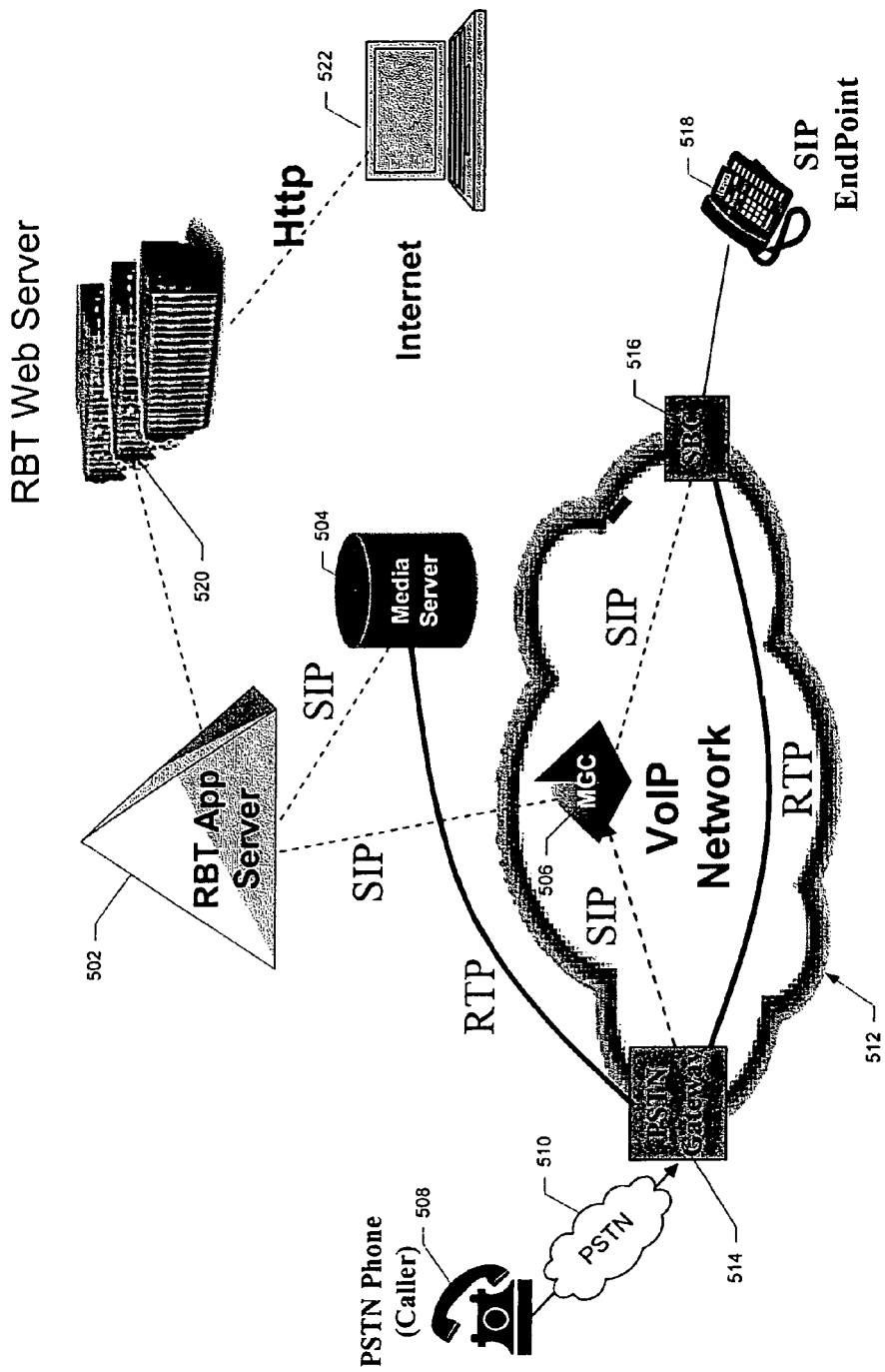
FIG. 5 is an exemplary system for implementing a preferred embodiment of a VoIP network customized ring-back tone service.

FIG. 5 is an exemplary system for implementing a preferred embodiment of a VoIP customized ring-back tone service. For instance, in FIG. 5 (and comparing it to FIG. 3), a ring-back tone (RBT) application server 502 replaces the AIN SCP 304; a media server 504 is used in replacement of the IPe 322; and a media gateway controller (MGC) 506 is used instead of a terminating SSP 318. The system of FIG. 5 is further comprised of a PSTN phone 508 that utilizes the PSTN 510 to connect to a VoIP network 512 through a PSTN gateway 514. The PSTN gateway 514 converts a call received from the PSTN 510 to a VoIP format and also communicates with the MGC 506 using, for example, session initiation protocol (SIP) messages, where SIP is a multimedia and telephony protocol that provides services including call forwarding, number delivery, authentication and other telecoms applications. The protocol can set up, control and tear down sessions including internet telephone calls and multimedia conferences The VoIP network is further comprised of a session border controller (SBC) 516 that communicates with the MGC 506 using SIP messages and attempts to complete a call to a SIP end point (called party) 518. The actual ring-back tone is played to the caller 508 via an RTP stream from the media server 504 through the VoIP network 512. RTP stands for real-time transport protocol, which is the Internet-standard protocol for the transport of real-time data, including audio and video. RTP is used in virtually all voice-over-IP architectures, for videoconferencing, media-on-demand, and other applications. A thin protocol, it supports content identification, timing reconstruction, and detection of lost packets. Once the called party 518 answers the call, the ring-back tone is stopped and another RTP stream is established between the called party 518 and the caller 508 via the VoIP network 512.

Other components of FIG. 5 include an RBT web-server 520 and an interface 522 to the web server 520 generally through a browser operating on a computing device. Generally, the interface 522 communicates with the web-server 520 via the Internet using HTTP protocol, as is well known.

Figure 6:
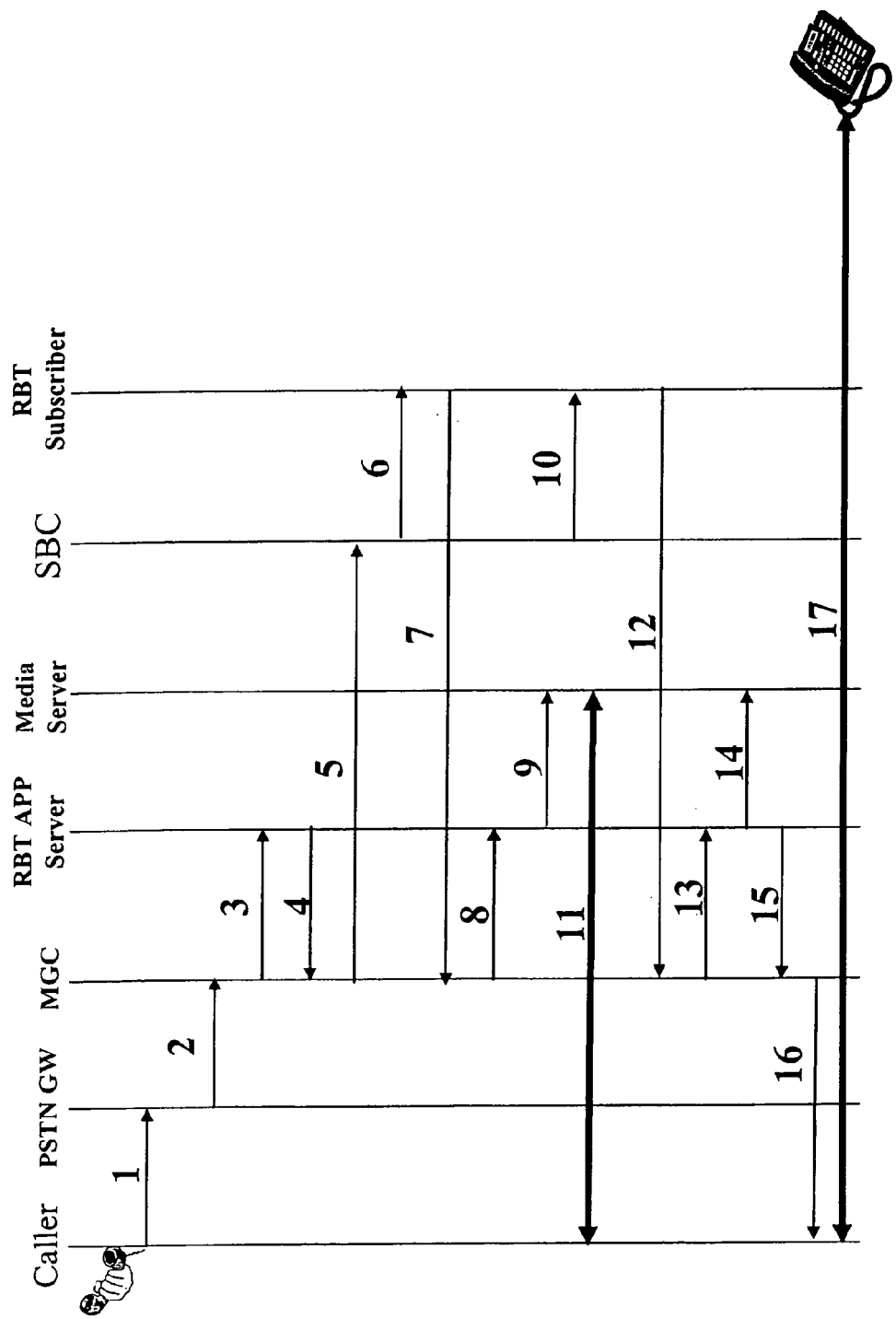
FIG. 6 is an exemplary call flow diagram that illustrates the steps of a method for playing ring-back tones over a VoIP wireline network, in accordance with a preferred embodiment.

FIG. 6 illustrates the steps of a method for playing ring-back tones, in accordance with a preferred embodiment. At step 1, a caller 505 dials a called party 518 that is a subscriber to a ring-back tone (VoIP) service and the call is routed via the PSTN 510 to the PSTN Gateway 514. At step 2, the PSTN Gateway 514 converts the call to VoIP and sends a SIP message to a MGC 506. At step 3, the MGC 506 sends a SIP INVITE message to a RBT application server 502. At step 4, the RBT application server 502 determines that the ring-back tone service is active for this call and attempts to ring the called party. The RBT application server 502 sends a SIP message to the MGC 506. At step 5, the MGC 506 sends a SIP message to a session border controller (SBC) 516. Then, at step 6, the SBC 516 attempts to complete the call to a SIP end point (called party) 518. At step 7, a SIP 180 Ringing message is sent back to the MGC 506 from the SIP endpoint 518. At step 8, the MGC 506 notifies the RBT application server 502 that ringing is detected. At step 9, the RBT application server 502 sends a SIP message to the MGC 506 to instruct the media server 504 to play a ring-back tone. At step 10, the MGC 506 instructs the media server 504 to play a specific ring-back tone in accordance with the preferences that the called party 518 has established on the RBT application server 502 through the RBT web-server 520. At step 11, an RTP stream is established between the media server 504 and the calling party 508, who hears the selected ring-back tone. At step 12, when the called party 518 answers the phone, a SIP 200 OK message is returned to the MGC 506. At step 13, the MGC 506 notifies the RBT application server 502 that the called party 518 answered the phone. At step 14, the RBT application server 502 instructs the media server 504 to stop playing the ring-back tone. At step 15, the RBT application server 502 sends another SIP INVITE message to the calling party 508 via the MGC 506. The MGC 506 sends the SIP INVITE message to the calling party 508 at step 16. And, at step 17, an RTP stream is established between the called party 518 and the calling party 508.

Figure 7:
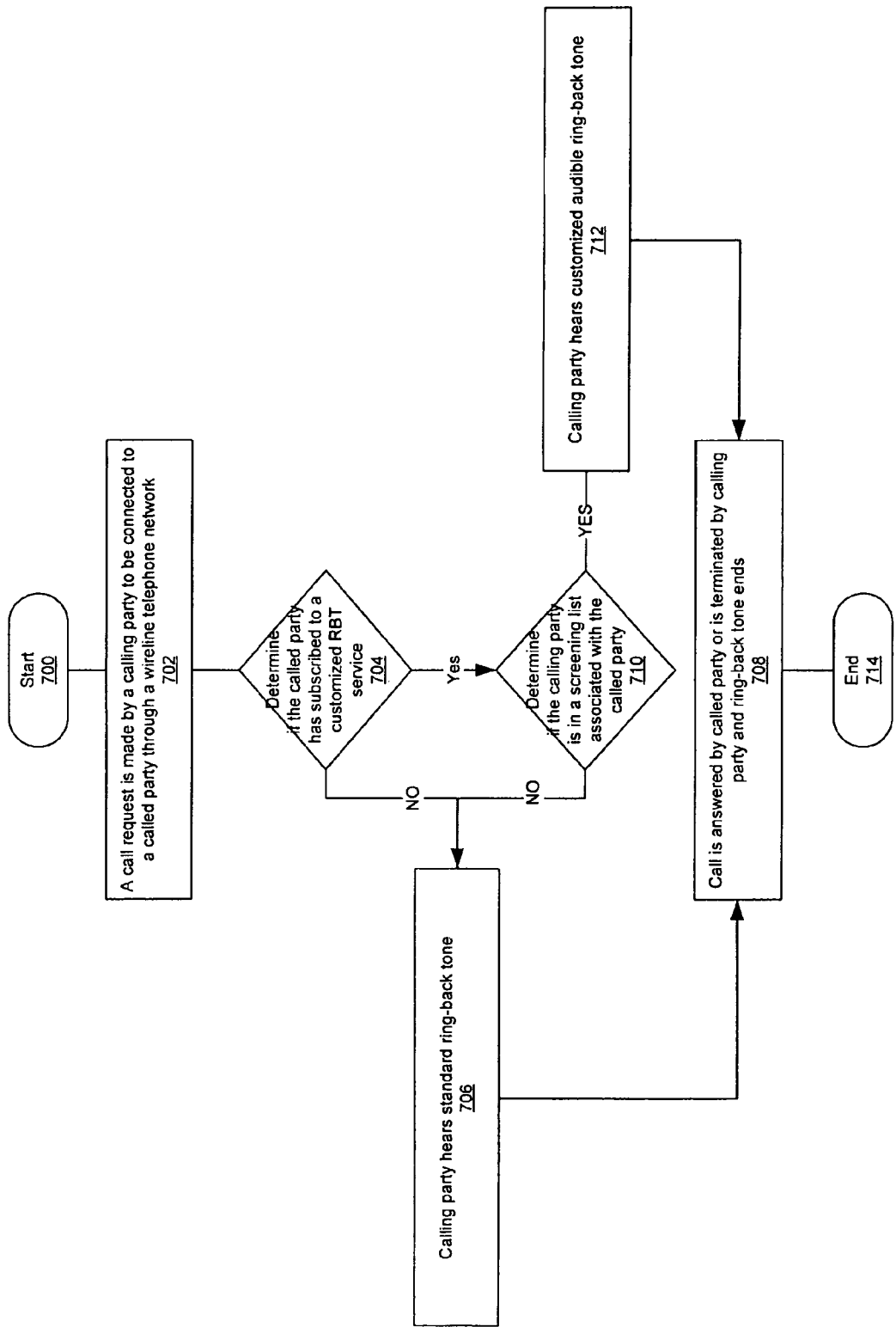
FIG. 7 is a flowchart for an exemplary process of providing customized ring-back tones to a calling party while waiting for a called party to answer the call.

FIG. 7 is a flowchart for an exemplary process of providing customized ring-back tones to a calling party while waiting for a called party to answer the call. The process starts at step 700. At step 702, a request is made by a calling party to be connected to a called party through a wireline network. At step 704, it is determined whether the called party has subscribed to a customized ring-back tone service by, for example, determining if a termination attempt trigger set for incoming calls (in a AIN network through the PSTN), or by the application server 702 determining if customized ring-back tones is set for the called party (in a VoIP network). If not, then the caller hears a standard ring-back tone (step 706) until the call is answered or until the call attempt is terminated in some other manner (step 708). If, at step 704, the called party has subscribed to a customized ring-back tone service, then the process goes to step 710 where it is determined whether the calling party is identified in a screening list associated with the called party. This screening list may be in the form, for example, of a database associated with an SCP 304 (for an AIN configuration), or a database associated with an RBT application server 502 (in a VoIP configuration). If the calling party is not identified in a screening list, then the process goes to step 706 where the calling party will hear the standard ring-back tone until the call is answered or otherwise terminated (step 708). It is to be appreciated that in some instances all calling parties that call the called party may be considered as being included in the screening list such that all calling parties hear the customized ring-back tone. If, at step 710, the calling party is identified in a screening list associated with the called party, then the process goes to step 712 where the calling party hears a customized audible ring-back tone until the call is answered or other wise terminated (step 708). The process ends at step 714.

It is to be appreciated that the wireline telephone network described in the process of FIG. 7 may be an advanced intelligent network through the PSTN, or it may be a VoIP network.

Modifications and Alternative Embodiments

Many modifications and other embodiments will come to mind to one skilled in the art having the benefit of the teachings presented in the foregoing descriptions of the preferred embodiments. For instance, the called party may have the ability to designate the ring-back tone to be played to callers depending upon the callers' telephone number, the time of day, the day of the week, etc. Furthermore, the ring-back tones may take the form of any audio data such as portion of popular songs, jokes or greetings, noises (e.g., creaking doors at Halloween) or even the called party's own recordings. The means for establishing the customized ring-back tone is the same regardless of whether the wireline network is AIN or VoIP and involves accessing a subscriber website via the Internet. It is also to be appreciated that the term "wireline" is not intended to limit the invention in any way as such term may be used to designate any non-cellular or non-wireless telephony service and does not require the VoIP or AIN network be comprised of copper or other forms of metallic wiring and contemplates the use of fiber optics, wires and cabling, and wireless transmissions, or combinations thereof, but not mobile wireless telecommunications service. Accordingly, it should be understood that the invention is not to be limited to the specific embodiments described herein, but rather to the appended claims, and that modifications and other embodiments are intended to be included within the scope of the appended claims. Although specific terms are employed herein, they are used in an inclusively descriptive sense only and not for purposes of limitation.

That which is claimed:

1. A method comprising:
receiving over a wireline telecommunications network from a calling party a call comprised of a first communication including a subject telephone number of a called party;
in response to said first communication, retrieving selected audio data associated with the subject telephone number from a database depending upon one or more of a hour of a day and a day of a week;
sending said selected audio data in a response message via the wireline telecommunications network to said calling party based at least in part on a forward call message provided by at least one of a service control point or an application server until said called party answers said call or said calling party ends said call, wherein the forward call message includes an identification of an audio data playing device and an announcement ID number to be played to the calling party.

2. The method of claim 1, wherein the wireline telecommunications network includes a public switched telephone network having an advanced intelligent network.

3. The method of claim 1, wherein the wireline telecommunications network include a VoIP network.

4. The method of claim 1, wherein retrieving selected audio data associated with the subject telephone number from a database comprises retrieving and playing an audio file from a database associated with the intelligent peripheral device.

5. A method comprising:
accessing a web site on a web server via an Internet browser computer application;
obtaining a level of authorized access to a screening list associated with a subject telephone number via said web site;
including one or more callers to said subject telephone number in said screening list and storing said screening list on said web server; and
associating said one or more callers in said screening list with different audio data files depending upon one or more of a hour of a day and a day of a week, such that when said one or more callers in said screening list call said subject telephone number over a wireline telecommunications network, based at least in part on a forward call message provided by at least one of a service control point or an application server, wherein the forward call message includes an identification of an audio data playing device and an announcement ID number to be played to the one or more caller, said one or more callers are played said different audio data files over said wireline telecommunications network depending upon one or more of the hour of the day and the day of the week.

6. The method of claim 5, wherein said screening list is configured to identify said one or more callers to said subject telephone number by a telephone number of each of said one or more callers and said screening list is further configured to associate said different audio data files with each of said caller's telephone numbers such that each said caller to said subject telephone number is capable of hearing said different audio files through said wireline telecommunications network.

7. The method of claim 5, wherein the screening list includes all callers to said subject telephone number such that all callers to the subject telephone number hear the same customized audible ring-back tone.

8. The method of claim 5, wherein associating said one or more callers in said screening list with different audio data files comprises associating said one or more callers with an identifier of said different audio files.

9. The method of claim 5, wherein the wireline telecommunications network includes a public switched telephone network having an advanced intelligent network.

10. The method of claim 9 further comprising storing said screening list on a service control point associated with said advanced intelligent network.

11. The method of claim 9, further comprising storing said different audio data files on the intelligent peripheral device associated with said advanced intelligent network.

12. The method of claim 5, wherein the wireline telecommunications network is a VoIP network.

13. The method of claim 12 further comprising storing said screening list on an application server associated with said VoIP network.

14. The method of claim 12, further comprising storing said different audio data files on a media server associated with said VoIP network.

15. A method, comprising
receiving a call request from a calling party to connect to a called party that is provisioned with a termination attempt trigger through a wireline telephone network, wherein the termination attempt trigger transmits a message to cause a query to determine whether to play a customized audible ring-back tone or a standard ring-back tone;
determining if said calling party is identified in a screening list for said called party;
if said calling party is in the screening list for said called party, then;
playing the customized audible ring-back tone depending upon a forward call message and one or more of a hour of a day and a day of a week to said calling party until said called party is connected to said calling party or until said call request is terminated; and
if said calling party is not in the screening list for said called party, then;
playing the standard ring-back tone to said calling party until said called party is connected to said calling party or until said call request is terminated.

16. The method of claim 15, wherein the wireline telephone network includes a public switched telephone network having an advanced intelligent network.

17. The method of claim 15, wherein the wireline telephone network is a voice over Internet protocol (VoIP) network.

18. The method of claim 15, wherein said customized audible ring-back tone is one or more of a recorded song, a portion of a recorded song, a single tone, a series of tones, a recorded announcement; music, a recorded voice message from the called party, or combinations thereof.

* * * * *